United States Patent

Aizawa et al.

[11] Patent Number: 5,968,673
[45] Date of Patent: Oct. 19, 1999

[54] SOLID ELECTROLYTE THIN FILM AND METHOD FOR PRODUCING THE SAME

[75] Inventors: Masanobu Aizawa; Akira Ueno; Masahiro Kuroishi, all of Fukuoka, Japan

[73] Assignee: Toto Ltd., Japan

[21] Appl. No.: 08/549,854

[22] PCT Filed: Mar. 17, 1995

[86] PCT No.: PCT/JP95/00458

§ 371 Date: Mar. 8, 1996

§ 102(e) Date: Mar. 8, 1996

[87] PCT Pub. No.: WO95/26031

PCT Pub. Date: Sep. 28, 1995

[30] Foreign Application Priority Data

Mar. 18, 1994 [JP] Japan .................... 6-072810

[51] Int. Cl.⁶ ..................... B32B 9/00
[52] U.S. Cl. ............. 428/688; 428/209; 428/323; 428/320; 428/370; 428/375; 428/516; 428/522; 428/689; 429/30; 429/33; 429/41; 429/44; 429/104; 429/193; 204/192.15; 204/242; 204/421; 204/424; 338/34; 501/103
[58] Field of Search ............... 428/76, 209, 323, 428/375, 370, 516, 688, 522, 689; 429/44, 33, 218, 193, 30, 46, 104, 41, 45; 338/34, 307; 204/192.15, 429, 426, 421, 242, 424; 427/58, 77; 501/103

[56] References Cited

U.S. PATENT DOCUMENTS 3,957,500 5/1976 Pitts .......................... 106/57
5,292,693 3/1994 Kaya et al. ..................... 501/103
5,624,542 4/1997 Shen et al. ..................... 204/283

FOREIGN PATENT DOCUMENTS

| 61-091880 | 5/1986 | Japan . |
| 61-198570 | 9/1986 | Japan . |
| 193065 | 4/1989 | Japan . |
| 0036786 | 5/1990 | Japan . |
| 2220361 | 9/1990 | Japan . |

*Primary Examiner*—William Krynski
*Assistant Examiner*—Abraham Bahta
*Attorney, Agent, or Firm*—Jones, Day, Reavis & Pogue

[57] ABSTRACT

The present invention relates to a solid electrolyte thin film and a manufacturing method for the same. The solid electrolyte thin film of the present invention comprises yttrium stabilized zirconia and is characterized in that the thickness of the film is 10 to 50 μm. In an embodiment, 80% or more of the surface area of the film is occupied by crystals having a crystal grain size of 6 to 18 μm. The present invention also includes a method for producing a solid electrolyte thin film comprising a sintered body of solid electrolyte powders. The method includes regulating the grain size of said solid electrolyte powders in the range of 0.1 to 5.0 μm; preparing a slurry solvent by mixing a binder and other materials with a solvent containing 10 to 80 wt % of a low volatile solvent, and mixing the slurry solvent with the solid electrolyte powder; and coating the obtained slurry onto a substrate. The slurry composition is prepared so that it has a viscosity in the range of 1 to 500 cps.

8 Claims, 1 Drawing Sheet

SOLID ELECTROLYTE THIN FILM AND METHOD FOR PRODUCING THE SAME

FIELD OF THE INVENTION

The present invention relates to a dense solid electrolyte thin film utilized in solid electrolyte type fuel cells (hereafter denoted SOFC), oxygen sensors, oxygen pumps, and the like and a method for producing the same.

PRIOR ART

Solid electrolyte thin films having permeability to oxygen ions ($O^{2-}$) as well as gas tightness are used in SOFC and such. These solid electrolyte thin films (made of $ZrO_2$, $CeO_2$, and such) are required to be thin and dense to achieve these characteristics. In addition, they are required to be economically formed into large sized thin films.

The conventional art technique is described herein with reference, as an example, to solid electrolyte thin films for SOFC. For SOFC, in general, an air electrode (made of $LaMnO_3$, and such materials) having a thickness of 30~2000 μm is formed on a porous substrate having a thickness of 0.3~5.00 mm, and a solid electrolyte thin film having a thickness of 30~1000 μm is formed over the air electrode. Over the solid electrolyte thin film, a fuel electrode (made of Ni base cermets, and such materials) is formed.

In order to obtain solid electrolyte thin films which are thin and dense, and at the same time, low in production cost and excellent in mass productivity as a goal, the following have been proposed in the past:

1) Production Process by Plasma Spray Coatings (Patent publication number Kokai sho: 61-198570):

This production process is characterized in that solid electrolyte starting materials comprising cerium-oxides or zirconium-oxides and divalent or trivalent metal-oxides of alkaline earth metals or rare earth elements and the like are formed into a solid solution. Then, the starting material in the form of a solid solution are crushed, and the grain size of the obtained powder is regulated, and then the powder is coated as an electrolyte film on a fuel cell substrate by plasma spray coating. According to an example described in the published specification, a solid electrolyte thin film having a thickness of 200 μm and terminal voltage of 790 mv is obtained by using plasma spray powder having a grain size of 2 μm or less.

2) Production Process by CVD.EVD (Chemical Electrical vapor deposition) (Patent publication number Kokai sho: 61-91880):

This production process is characterized in that the first electrode is adhered onto a porous support member, an intermediate layer substance with electrical conductivity and oxygen permeability is adhered onto the first electrode to protect the first electrode from a high temperature vapor of halides, the intermediate layer substance is contacted with a high temperature vapor of metal halide to form a solid electrolyte composed of metal oxides on the whole surface of the intermediate layer, and the second electrode is adhered on the whole surface of the solid electrolyte.

3) Production Process by Slurry Coating (Patent publication number Kokai Hei:1-93065)

This production process is a process for manufacturing a cylindrically-shaped solid electrolyte wherein a fuel electrode layer and an air electrode layer are overlapped and an electrolyte layer is interposed there between, and characterized in that either one of the air electrode layer or the fuel electrode layer is formed into a tubular shape. A powder slurry of each material for forming the electrolyte and the other electrode layer is coated on the surface of the tube one by one and dried, and then the tube is baked. According to an example of the published specification, an yttrium stabilized zirconia (YSZ) thin film having a thickness of 150 μm is obtained.

(4) Production by Plasma Spray Coating and Filler Slurry Coating (Patent publication number Kokai Hei:2-220361)

This production process relates to a tubular type SOFC formed by laying up a fuel electrode, a solid electrolyte and an air electrode on the outside of a substrate tube, and is characterized in that a filler material containing 40 wt % or more (solids concentration) of yttrium stabilized zirconia is coated on openings of laid-up solid electrolyte on the substrate tube, and then the tube is dried and baked. According to an example described in the published specification, a slurry containing YSZ powders with a grain size of 0.05 to 2.5 μm is coated (brush coating) on an air plasma spray coated film having a thickness of 100 μm, and then the film is dried and baked. Finally, a solid electrolyte thin film with very low gas permeability was obtained.

TASKS TO BE SOLVED BY THE INVENTION

The aforesaid conventionally proposed techniques involve the following problems:

1) Plasma Spray Coating Process:

The films gained through this process is fundamentally porous. Therefore, the film should be made relatively thick to extinguish gas permeability, or a filler should be applied to seal porosities after plasma spray coating (like the above-described process in item (4)).

2) CVD Processes, EVD Process:

These processes are appropriate for forming dense thin films. However, they require expensive equipment since film forming should be carried out under a special atmosphere and a physical condition isolated from the air. For large sized parts, large sized equipment is naturally required to accommodate the parts. Accordingly, film coating onto large parts is difficult as well as low in productivity and high in cost.

3) Slurry Coating Process:

This process is an economical process since film formation is carried out in the air and expensive equipment is not necessary. This process, however, has been understood to have problems in density and thickness of the film, and the solid electrolyte thin film disclosed as an example in the Patent publication number Hei 1-93065 has a thickness of 150 μm, which is considerably thicker than the target thickness of 10 to 50 μm for this kind of a film.

4) Plasma Spray Coating and Slurry Filling Process:

This process requires two-step work, and moreover the film thickness tends to be thicker.

It is an object of the present invention to provide a method for producing a dense solid electrolyte thin film having a thickness in the range of 10 to several hundred μm, which is economical and capable of being mass produced and which is applicable to a large surface area.

It is a further object of the present invention to provide a solid electrolyte thin film that can be manufactured through a slurry coating process to be a dense and thin film.

MEANS FOR SOLVING THE TASKS AND ACTION

In order to achieve the above tasks, the solid electrolyte thin film of the present invention is a solid electrolyte thin film comprising stabilized $ZrO_2$ containing 3 to 20 mol % of $Y_2O_3$ (YSZ); and is characterized in that the thickness of the film is 10 to 50 μm and more than 80% of the whole surface area of the film surface is occupied by crystals having a crystal grain size of 6 to 18 μm.

By controlling the film thickness and the crystal grain size as indicated above, a dense solid electrolyte thin film having almost no cracks among the crystal grains can be obtained.

The solid electrolyte thin film of the present invention may also be a solid electrolyte thin film comprising stabilized $ZrO_2$ containing 3 to 20 mol % of $Y_2O_3$(YSZ) and, having a thickness of 10 to 50 μm, and a half value width in X-ray diffraction (2θ) of less than 0.16.

When the half value thickness is within the above range, since the crystal characteristics are excellent and uniform sintering is carried out, a dense solid electrolyte thin film without cracks among crystal grains and without open porosities can be obtained.

The method of the present invention is a method for producing a thin film comprising a sintered body of solid electrolyte powder, characterized in that the method includes a grain size regulating process wherein the size of said solid electrolyte powders is regulated within 0.1 to 5.0 μm; a slurry preparing process wherein a slurry solvent is prepared by mixing 0.1 to 10 parts of a binder, 0.1 to 4 parts of a dispersant and 0.1 to 4 parts of an anti-foaming agent to 100 parts of a solvent containing 10 to 80 wt % of a low-volatile solvent and this slurry solvent is mixed with 5 to 40 parts by weight of said solid electrolyte powders whose grain size has been regulated as indicated above, to obtain a slurry; and a coating process wherein the obtained slurry is coated onto a substrate, the slurry composition being prepared so as to arrange the viscosity of said slurry in the range of 1 to 500 cps.

The solid electrolyte used in the production method of the present invention is not limited to a specific substance. $Y_2O_3$ stabilized $ZrO_2$ (YSZ), for example, may be applicable. However, in any kinds of electrolytes, a material containing less impurity is more preferable; particularly, an amount of the total impurities such as Si, Mn and the like is preferably 0.1 wt % or less. The $Y_2O_3$ content in YSZ is preferably 3 to 20 mol %, more preferably 8 to 12 mol %, since ion conductivity is excellent in this range.

The grain size of the solid electrolyte powders is preferably between 0.1 and 5.0 μm, more preferably 0.2 to 0.4 μm. When a material with a relatively wide range of grain size of 0.1 to 5 μm is used, the film thickness for obtaining a dense (gas-tight) films is required to be from several tens to several hundred μm. However, when materials with a relatively narrow range of grain size of 0.2 to 0.4 μm is used, dense films may be formed by a film thickness of from several μm to several tens μm. The materials are preferably regulated in the grain size by using classifiers such as pneumatic classifiers, and the like.

The characteristic feature of the solvent to be used in the slurry solvent of the present invention resides in that the solvent contains 10 to 80 wt %, more preferably 15 to 40 wt %, of a low-volatile solvent. This low-volatile solvent acts to suppress altering of the slurry viscosity during preparation and storage process and to prevent crack generation caused by drying after film formation using the slurry (for example, after forming a film by dipping). Here, the degree of volatility is preferably below 1, compared with that of butyl acetate as 100.

An example of a low-volatile solvent is α-terpineol. The reason that the content of low-volatile solvent is limited to 10 to 80 wt % is that the film is susceptible to cracks in the process of drying after the film formation (for example, by dipping) in case of a low content (less than 10 wt %), and that dispersibility of the powder becomes poor in case of a high content (over 80 wt %). The content of the low-volatile solvent is more preferably 15 to 40 wt %. Within this range, dispersion of powders in the slurry and drying condition after dipping is best balanced in characteristics.

Solvents other than the low-volatile solvent contained in the slurry solvent act to improve dispersibility of powder and defoambility. Ethyl alcohol is preferable for such a solvent.

Binders contained in the slurry solvent of the present invention act to improve coating performance (adhesion) of powders to the substrate. The reason why the amount of binders is limited to 0.1 to 10 parts based on 100 parts of the solvent is that coating performance is poor in case of a low content (less than 0.1 wt %), and that dispersibility of powder becomes poor in case of a high content (over 10 wt %) Ethyl cellulose, for example, is preferable for such a binder.

Dispersants contained in the slurry of the present invention act to improve dispersibility of powder. The reason why the amount of dispersant is limited to 0.1 to 4 parts based on 100 parts of the solvent is that dispersibility is poor in case of a low content (less than 0.1 wt %) and that the slurry tends to denaturate in case of a high content (over 4 wt %). Polyoxyethylene alkyl phosphoric ester, for example, is preferable as a dispersant.

Anti-foaming agents contained in the slurry solvent of the present invention act to eliminate foams in the slurry. The reason why the amount of anti-foaming agents is limited to 0.1 to 4 parts based on 100 parts solvent is that the effect is not expected in case of less than the above range and binders in the slurry tends to denaturate in case of over the above range. Sorbitan sesqui-oleate, for instance, is preferable for an anti-foaming agent.

For mixing the powders, any common process, such as the use of ball mills may be used.

The process for coating slurry on the substrate in the method of the present invention is not narrowly limited to a certain process. It may be accomplished by dipping, spraying, brushing, or such processes. Of these, dipping is preferable since it is simple, highly mass-productive, and low in cost. As a dipping method, dipping under pressured gases or vacuum may be applicable in addition to a normal dipping method in which the substrate is dipped in a slurry under air. Times of dipping may be selected according to the required film thickness and the slurry compositions.

It is important in the production method of the present invention to control slurry viscosity within the range of 1 to 500 cps, more preferably 1 to 100 cps. The reason why the low limit is restricted to 1 cps is to prevent the slurry from penetrating into the porous substrate. The reason why the upper limit is restricted to 500 cps is to prevent cracks during drying process after coating slurry.

In order to control the slurry viscosity within the above range, contents of binders and powders are controlled within the range described above.

After dipping in the slurry, drying and baking may be carried out in any applicable manner.

EXAMPLES

Figure 1A:
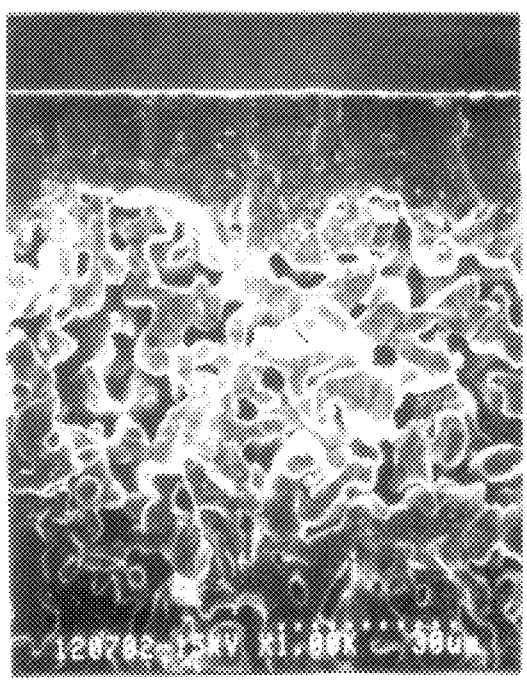
FIG. 1 shows SEM photographs showing the surface and sectional crystal structure of the thin film of an example of the present invention and a comparative example. (A) shows a dense film of the example of the present invention and (B) shows a porous film of the comparative example.

Examples of the present invention and comparative examples are now described.

Table 1 shows a list of examples and comparative examples to be described below.

TABLE 1

| | ZrO$_2$ powder parts by weight | Viscosity cps | α-terpineol/ ethyl alcohol parts by weight | ethyl cellulose parts by weight | ZrO$_2$ powder grain size μm |
|---|---|---|---|---|---|
| Comparative Ex. 1 | 4 | 1 or less | 8.5/91.5 | 0.08 | 0.3 μm (0.2–0.4) |
| Ex. 1 | 5 | 1 ~ 5 | 10/90 | 0.1 | 0.3 μm (0.2–0.4) |
| Ex. 2 | 25 | 20 ~ 30 | 50/50 | 2.0 | 0.3 μm (0.2–0.4) |
| Ex. 3 | 40 | 450 ~ 500 | 80/20 | 4.0 | 0.3 μm (0.2–0.4) |
| Comparative Ex. 2 | 45 | 650 or more | 85/15 | 4.2 | 0.3 μm (0.2 ~ 0.4) |
| Comparative Ex. 3 | 15 | 10 ~ 20 | 50/50 | 1.0 | 0.1 μm or less |
| Ex. 4 | 25 | 60 ~ 140 | " | 2.8 | 2.0 (0.1–5.0) |
| Comparative Ex. 4 | 25 | 100 ~ 200 | " | 4.0 | 8 (5–10) |

Comparative Example 1, present-invention Examples 1 to 3, and Comparative Example 2 are experiments carried out by fundamentally varying slurry viscosity. Comparative Example 3, present-invention Example 4 and Comparative Example 4 are experiments on varying ZrO$_2$ powder grain size.

Comparative Example 1

(1) Solid electrolyte powder preparation:
ZrO$_2$+8 mol % Y$_2$O$_3$ powders were ground by using a ball mill and then the grain size was regulated to the range of 0.2 to 0.4 μm (average: 0.3 μm) by a pneumatic classifier.

(2) Slurry solvent:
8.5 parts of α-terpineol as a low-volatile solvent and 91.5 parts of ethyl alcohol as a volatile solvent were mixed and then 0.08 parts of ethyl cellulose as a binder, 1 part of polyoxyethylene alkyl phosphoric ester as a dispersant and 1 part of sorbitan sesqui-oleate were added to the solvent and mixed to obtain the slurry solvent.

(3) Slurry preparation:
100 parts by weight of the above slurry solvent and 4 parts by weight of the above powders having the above-described grain size were mixed to obtain a slurry with a viscosity of less than 1 cps.

(4) Dipping:
The slurry was coated onto the surface of the substrate (substance: LaSrMnO$_3$ size: 12 mm diameter×10 mm diameter×100 mm length, porosity: 35%) by dipping.

(5) Drying:
The substrate was held at room temperature for 1 hour and then at 100° C. for 1 hour.

(6) Baking:
The substrate was baked at 1500° for 5 hours. The film obtained through the above processes had a thickness of less than 10 μm and a gas permeability coefficient (N$_2$ gas used) of 1.0×10$^{-19}$ m$^2$·s/kg or more. Consequently a dense film was not obtained.

Example 1

The process of Comparative Example 1 was followed except for changing the slurry solvent and the slurry preparation as follows:

(1) Slurry solvent:
α-Terpineol 10 parts, ethyl alcohol 90 parts, ethyl cellulose 0.1 parts, polyoxyethylene alkyl phosphoric ester 1 part, sorbitan sesqui-oleate 1 part.

(2) Slurry preparation, composition and viscosity:
the above slurry solvent (100 parts) was mixed with ZrO$_2$ powder (5 parts), having a viscosity of 1 to 5 cps.

The solid electrolyte thin film obtained through the above processes had a thickness of about 10 μm and a gas permeability coefficient of less than 8.5×10$^{-11}$ m$^2$·s/kg. Consequently a considerably dense film could be obtained. Such dense films can be used for fuel electrodes, and the like.

Example 2

The process of Comparative Example 1 was followed except for changing the slurry solvent and the slurry preparation, as follows:

(1) Slurry solvent:
α-Terpineol 50 parts, ethyl alcohol 50 parts, ethyl cellulose 1.8 parts, Polyoxyethylene alkyl phosphoric ester 1 part, sorbitan sesqui-oleate 1 part (2) Slurry preparation, composition and viscosity:
the above slurry solvent (100 parts) was mixed with ZrO$_2$ powder (25 parts), having a viscosity of 20 to 30 cps The solid electrolyte film obtained through the above processes had a thickness of 15 to 25 μm and a gas permeability coefficient of less than 8.5×10$^{-11}$ m$^2$·s/kg. Thus, a considerably dense film was obtained. Such dense films can be used for fuel electrodes, and the like.

Example 3

The process of Comparative Example 1 was followed except for changing the slurry solvent and the slurry preparation, as follows:

(1) Slurry solvent:
α-Terpineol 80 parts, ethyl alcohol 20 parts, ethyl cellulose 4 parts, polyoxyethylene alkyl phosphoric ester 1 part, sorbitan sesqui-oleate 1 part.

(2) Slurry preparation, composition and viscosity:
the above slurry solvent (100 parts), was mixed with ZrO$_2$ powder (40 parts), having a viscosity of 450 to 500 cps.

The solid electrolyte thin film obtained through the above processes had a thickness of 40 μm. The gas permeability of this film was measured by using a nitrogen gas and found to be zero, and, thus, or dense solid electrolyte thin film was obtained.

Comparative Example 2

The process of Comparative Example 1 was followed except for changing the slurry solvent and the slurry preparation, as follows:

(1) Slurry solvent:
α-Terpineol 85 parts, ethyl alcohol 15 parts, ethyl cellulose 4.2 parts, polyoxyethylene alkyl phosphoric ester 1 part, sorbitan sesqui-oleate 1 part.

(2) Slurry preparation, composition and viscosity:
the above slurry solvent (100 parts) was mixed with ZrO$_2$ powder (45 parts), having a viscosity of 650 cps or more.

In this process, after drying subsequent to the dipping process, a few cracks were observed in the thin film. These cracks propagated during the baking process, and, therefore, a good solid electrolyte thin film was not obtained.

Comparative Example 3

The process of Comparative Example 1 was followed except for changing the grain size of the solid electrolyte powders, the slurry solvent and the slurry preparation, as follows:

(1) Size of the solid electrolyte powder:
less than 0.1 μm.
(2) Slurry solvent:
α-Terpineol 50 parts, ethyl alcohol 50 parts, ethyl cellulose 1 parts, polyoxyethylene alkyl phosphoric ester 1 part, sorbitan sesqui-oleate 1 part.
(3) Slurry preparation, composition and viscosity:
the above slurry solvent (100 parts) was mixed with $ZrO_2$ powder (15 parts), having a viscosity of 5 to 10 cps.

As a result of the above processes, a solid electrolyte thin film having a thickness of about 10 to 15 μm was obtained. The gas permeability coefficient of this film was $2.4 \times 10^{-10}$ $m^2 \cdot s/kg$ or more and this film was found to be rather porous. Consequently, a good solid electrolyte thin film was not obtained.

Example 4

The process of Comparative Example 1 was followed except for changing the grain size of the solid electrolyte powders, the slurry solvent and the slurry preparation, as follows:
(1) Size of the solid electrolyte powder:
0.1 to 5 μm (average grain size 2 μm).
(2) Slurry solvent:
α-Terpineol 50 parts, ethyl alcohol 50 parts, ethyl cellulose 2.8 parts, polyoxyethylene alkyl phosphoric ester 1 part, sorbitan sesqui-oleate 1 part.
(3) Slurry preparation, composition and viscosity:
the above slurry solvent (100 parts) was mixed with $ZrO_2$ powder (25 parts), having a viscosity of 60 to 140 cps.

As a result of the above process, a dense solid electrolyte thin film having a thickness of 20 to 35 μm and a gas permeability coefficient of less than $9.0 \times 10^{-11}$ $m^2 \cdot s/kg$ was obtained.

Comparative Example 4

The process of Comparative Example 1 was followed except for changing the grain size of the solid electrolyte powders, the slurry solvent and the slurry preparation, as follows:
(1) Size of the solid electrolyte powder:
5 to 10 μm (average grain size 8 μm).
(2) Slurry solvent:
α-Terpineol parts 50 parts, ethyl alcohol 50 parts, ethyl cellulose 4 parts, polyoxyethylene alkyl phosphoric ester 1 part, sorbitan sesqui-oleate 1 part.
(3) Slurry preparation, composition and viscosity:
the above slurry solvent (100 parts) was mixed with $ZrO_2$ powder (25 parts), having a viscosity 10 to 200 cps.

As a result of the above processes, a solid electrolyte thin film having a thickness of about 25 to 40 μm was obtained. The gas permeability coefficient of this film was $1 \times 10^{-9}$ $m^2 \cdot s/kg$ or more, and this film was found to be rather porous. Thus, good solid electrolyte thin film was not obtained.

Crystal Grain Size

SEM observation was conducted on the film structures of the solid electrolyte thin films of Examples 1, 2 and 3 where dense films were obtained, and on the solid electrolyte thin films of Comparative Examples 3 and 4, where only porous films were obtained. The dense films of Examples 1–3 were found to be composed of crystals having 6 to 18 μm crystal grain size, and the primary grain size of the porous films of Comparative Examples 3 and 4 were found to be 1 to 5 μm. The reason for this is that, in the examples of the present invention, diffusionability and sinterability between crystal grains were improved whereby crystal grains could grow. In contrast, in the Comparative Examples, the diffusionability and sinterability between crystal grains were low and the grains did not grow.

Accordingly, it may be concluded that a dense solid electrolyte thin film is obtainable by controlling crystal grain size within the range of 6 to 18 μm.

Figure 1B:
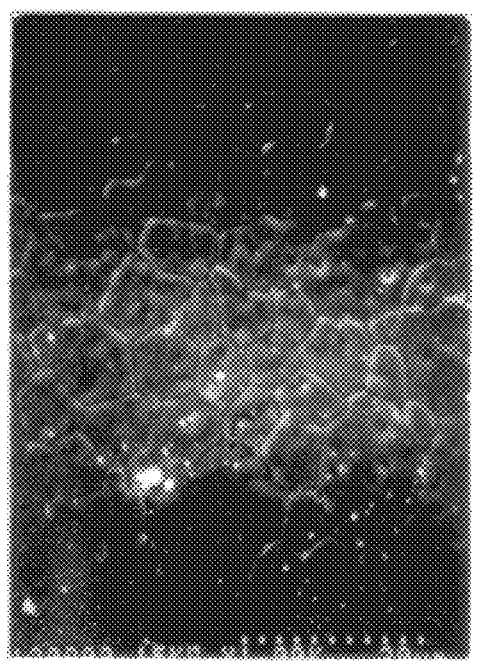
Figure 2A:
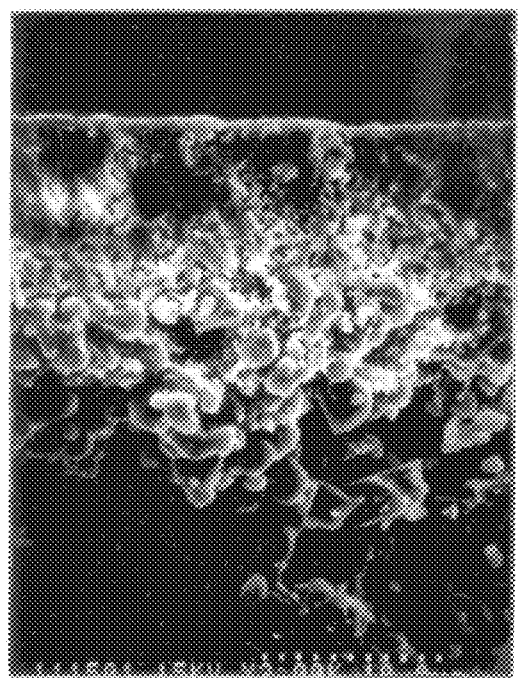
Figure 2B:

FIG. 1 shows SEM photographs showing surface and sectional crystal structure of the solid electrolyte thin film of an example of the present invention and a comparative example. (A) shows a dense film of the example of the present invention and (B) shows a porous film of the comparative example.

X-RAY DIFFRACTION HALF VALUE WIDTH

The full width at half maximum (FWHM) by X-ray diffraction was measured on each of the solid electrolyte thin films of Examples 1, 2 and 3, where dense films were obtained, and on the solid electrolyte thin films of Comparative Examples 3 and 4, where only porous films were obtained. The FWHMs were measured based on the peak where $2\theta = 30.2$ to $30.4$, which is the main peak of the 8 mol % $Y_2O_3$ stabilized $ZrO_2$. MXP-18 manufactured by Mack Sience was used for a diffraction equipment and radiation source was Cu, tube voltage was 50·OKV and tube current was 300 mA.

The FWHMs were within the range of 0.14 to 0.16 in dense films of the examples of the present invention, and 0.18 to 0.20 in porous films of the comparative examples.

Another example of the present invention is now described.
(1) Solid Electrolyte Powder Preparation:
$ZrO_2$+8 mol % $Y_2O_3$ powders were ground by a ball mill and then the grain size was arranged by a pneumatic classifier.
(2) Slurry Solvent:
40 parts of α-Terpineol and 60 parts of ethyl alcohol were mixed and then 4 parts of ethyl cellulose was added as a binder, 1 part of polyoxyethylene alkyl phosphoric ester was added as a dispersant and 1 part of sorbitan sesqui-oleate was also added, and all materials mixed to obtain the slurry solvent.
(3) Slurry Preparation:
100 parts by weight of the above-described slurry solvent and 80 parts of the above-described powders arranged were mixed to obtain a slurry with a viscosity of 300 to 350 cps.
(4) Dipping:
The slurry was coated onto a surface of the substrate (substance: $LaSrMnO_3$ size: 12 mm diameter×10 mm diameter×100 mm length, porosity: 35%) by dipping.
(5) Drying:
The substrate was held at room temperature for 1 hour and then at 100° C. for 1 hour.
(6) Baking:
The substrate was baked at 1500° for 5 hours.

As a result of the above process, a solid electrolyte thin film having a thickness of 30 μm was obtained. The gas permeability of the film was measured but no gas permeability was admitted. Thus, a dense electrolyte film was obtained.

ADVANTAGEOUS EFFECT OF THE INVENTION

As clearly understood from the above descriptions, the present invention exhibits the—following advantageous effects.

(1) A solid electrolyte thin film can be formed on the whole surface or any part of variously shaped substrates (flat plate or inner and outer surfaces of pipes, and the like.)
(2) Dense and thin films can be formed.
(3) In comparison with CVD•EVD methods or plasma spray coating methods, expensive manufacturing equipment is not required, and application to large scale parts is easy.
(4) According to (1) to (3), SOFC cells with high performance and low production cost and elements for example, oxygen sensors and oxygen pumps, and the like, can be provided.

We claim:

1. A solid electrolyte film comprising stabilized $ZrO_2$, said $ZrO^2$ comprising 3 to 20 mol % $Y_2O_3$, wherein said solid electrolyte film has a thickness of between 10 $\mu$m and 50 $\mu$m, and at least 80% of the surface area of said film is occupied by crystals having a crystal grain size of between 6 $\mu$m and 18 $\mu$m.

2. A solid electrolyte thin film comprising stabilized $ZrO_2$, said $ZrO_2$ comprising 3 to 20 mol % $Y_2O_3$, wherein said solid electrolyte film has a thickness of between 10 $\mu$m and 50 $\mu$m, and said solid electrolyte film has a FWHM (2θ), as measured by an X-ray diffraction technique, of 0.16 or less.

3. A solid electrolyte film according to claim 1 wherein said solid electrolyte film has a gas permeability coefficient of $9 \times 10^{-11}$ $m^{2\cdot}$ s/kg or less.

4. A solid electrolyte thin film according to claim 2 wherein said solid electrolyte film has a gas permeability coefficient of $9 \times 10^{-11}$ $m^{2\cdot}$ s/kg or less.

5. A method for producing a solid electrolyte film comprising a sintered body of solid electrolyte powders, said method comprising the steps of:
   (A) regulating the grain size of said solid electrolyte powders in the range of 0.1 to 5.0 $\mu$m;
   (B) preparing a slurry having a viscosity of between 1 cps and 500 cps, by mixing together:
      (1) a slurry solvent comprising:
         a) 0.1 to 10 parts by weight of a binder;
         b) 0.1 to 4 parts by weight of a dispersant;
         c) 0.1 to 4 parts by weight of an anti-foaming agent; and
         d) 100 parts by weight of a solvent containing between 10% and 80% by weight of low volatile solvent; and
      (2) 5 to 40 parts by weight of said solid electrolyte powder; and
   (C) coating said slurry onto a substrate.

6. The method according to claim 5, wherein said solid electrolyte comprises a stabilized $ZrO_2$ comprising 3 to 20 mol % $Y_2O_3$.

7. The method according to claim 5 wherein said solid electrolyte powder has a grain size of between 0.2 $\mu$m and 0.4 $\mu$m.

8. The method according to claim 6 wherein said solid electrolyte powder has a grain size of between 0.2 $\mu$m and 0.4 $\mu$m.

* * * * *